(12) United States Patent
Hermann et al.

(10) Patent No.: US 10,543,530 B2
(45) Date of Patent: Jan. 28, 2020

(54) UNPACKING DEVICE ALLOWING RESIDUAL RAW MATERIAL POWDER REMOVAL

(71) Applicant: SLM Solutions Group AG, Luebeck (DE)

(72) Inventors: André Hermann, Luebeck (DE); Toni Adam Krol, Luebeck (DE); Andreas Wiesner, Luebeck (DE); Jan Wilkes, Luebeck (DE); Bodo Haack, Luebeck (DE); Karsten Huebinger, Luebeck (DE); Peter Koerner, Luebeck (DE); Simon Mueller, Luebeck (DE); Kaj Merten Berggreen, Luebeck (DE); Jonas Mersch, Luebeck (DE)

(73) Assignee: SLM Solutions Group AG, Luebeck (DE)

( * ) Notice: Subject to any disclaimer, the term of this patent is extended or adjusted under 35 U.S.C. 154(b) by 284 days.

(21) Appl. No.: 15/350,084

(22) Filed: Nov. 13, 2016

(65) Prior Publication Data

US 2017/0136543 A1  May 18, 2017

(30) Foreign Application Priority Data

Nov. 13, 2015 (EP) .................................... 15194424
Nov. 10, 2016 (EP) .................................... 16198240

(51) Int. Cl.
*B22F 3/105* (2006.01)
*B33Y 40/00* (2015.01)
(Continued)

(52) U.S. Cl.
CPC ........ *B22F 3/1055* (2013.01); *B23K 15/0026* (2013.01); *B23K 15/0086* (2013.01);
(Continued)

(58) Field of Classification Search
CPC ............ B22F 3/1055; B22F 2003/1059; B22F 2003/1056; B29C 64/35; B29C 64/153;
(Continued)

(56) References Cited

U.S. PATENT DOCUMENTS 4,277,260 A * 7/1981 Browning .......... B01D 46/0068
96/426
5,795,359 A * 8/1998 McLeish ............ B01D 46/0067
55/302

(Continued)

FOREIGN PATENT DOCUMENTS

CN         105026076 A     11/2015
DE    202013009787 U1      2/2014
(Continued)

OTHER PUBLICATIONS

Translation of Japanese Examination Report, Corresponding Japanese Application No. JP2016-221479, dated Jan. 30, 2018, 2 pages.
(Continued)

*Primary Examiner* — Nahida Sultana
(74) *Attorney, Agent, or Firm* — Taft Stettinius & Hollister LLP

(57) ABSTRACT

An unpacking device for use in an apparatus for producing a three-dimensional work piece by irradiating layers of a raw material powder with electromagnetic or particle radiation, the unpacking device comprises a holding device which is configured to hold a building chamber arrangement. The building chamber arrangement comprises a building chamber accommodating a carrier, wherein the carrier is configured to receive a three-dimensional work piece produced from a raw material powder by an additive layering process. An engagement unit of the unpacking device is configured to engage with the carrier of the building chamber arrangement. A moving mechanism is configured to cause a relative movement between the building chamber and the engage- (Continued)

ment unit with the carrier engaged therewith so as to allow a separation of the carrier with a three-dimensional work piece received thereon from the building chamber. Finally, the unpacking device comprises a raw material powder removal mechanism which is configured to cause at least one of a vibration and a rotation of the engagement unit with the carrier engaged therewith so as to remove residual raw material powder from the three-dimensional work piece received on the carrier.

28 Claims, 6 Drawing Sheets

(51) Int. Cl.
  *B33Y 30/00* (2015.01)
  *B23K 26/342* (2014.01)
  *B23K 26/70* (2014.01)
  *B23K 15/00* (2006.01)
  *B23K 26/16* (2006.01)

(52) U.S. Cl.
  CPC ............ *B23K 26/16* (2013.01); *B23K 26/342* (2015.10); *B23K 26/702* (2015.10); *B33Y 30/00* (2014.12); *B33Y 40/00* (2014.12); *B22F 2003/1059* (2013.01)

(58) Field of Classification Search
  CPC .... B23K 26/16; B23K 26/342; B23K 26/702; B23K 15/0086; B23K 15/0026; B33Y 30/00; B33Y 40/00; Y02P 10/295
  See application file for complete search history.

(56) References Cited

U.S. PATENT DOCUMENTS

| | | | |
|---|---|---|---|
| 9,586,365 B2* | 3/2017 | Chen | ................. B07B 4/00 |
| 2002/0090410 A1* | 7/2002 | Tochimoto | ............ B29C 64/165 |
| | | | 425/215 |
| 2004/0012112 A1 | 1/2004 | Davidson et al. | |
| 2007/0001342 A1 | 1/2007 | Oberhofer et al. | |
| 2007/0126157 A1 | 6/2007 | Bredt | |
| 2008/0241404 A1* | 10/2008 | Allaman | ................ B29C 64/165 |
| | | | 427/333 |
| 2010/0193806 A1* | 8/2010 | Byun | .................... H01L 33/507 |
| | | | 257/88 |
| 2013/0052291 A1* | 2/2013 | Morikawa | ............. B29C 64/153 |
| | | | 425/135 |
| 2016/0008922 A1 | 1/2016 | Schwarze | |
| 2016/0236422 A1* | 8/2016 | Sakura | ................. B29C 67/0096 |
| 2016/0279871 A1* | 9/2016 | Heugel | ................. B22F 3/1055 |
| 2017/0144874 A1* | 5/2017 | Huebinger | ............. B29C 64/35 |
| 2019/0009338 A1* | 1/2019 | McMurtry | ........... B22F 3/1055 |
| 2019/0118468 A1* | 4/2019 | Bobar | .................. B29C 64/245 |
| 2019/0176233 A1* | 6/2019 | Varetti | .................. B29C 64/214 |

FOREIGN PATENT DOCUMENTS

| | | |
|---|---|---|
| JP | 2003225948 A | 8/2003 |
| JP | 2013534974 A | 9/2013 |
| WO | 2007064946 A2 | 6/2007 |
| WO | 2015071184 A1 | 5/2015 |

OTHER PUBLICATIONS

European Search Report, EP15194424.6, SLM Solutions Group AG, dated May 9, 2016, 5 pages.
State Intellectual Property Office of the P. R. of China, Examination Report in corresponding application No. 201611001905.6, dated May 28, 2018, 5 pp.

* cited by examiner

UNPACKING DEVICE ALLOWING RESIDUAL RAW MATERIAL POWDER REMOVAL

The present invention relates to an unpacking device for use in an apparatus for producing a three-dimensional work piece by irradiating layers of a raw material powder with electromagnetic or particle radiation. The invention further relates to a method of operating an unpacking device of this kind and to an apparatus for producing a three-dimensional work piece by irradiating layers of a raw material powder with electromagnetic or particle radiation which is equipped with an unpacking device of this kind.

Powder bed fusion is an additive layering process by which pulverulent, in particular metallic and/or ceramic raw materials can be processed to three-dimensional work pieces of complex shapes. To that end, a raw material powder layer is applied onto a carrier and subjected to laser radiation in a site selective manner in dependence on the desired geometry of the work piece that is to be produced. The laser radiation penetrating into the powder layer causes heating and consequently melting or sintering of the raw material powder particles. Further raw material powder layers are then applied successively to the layer on the carrier that has already been subjected to laser treatment, until the work piece has the desired shape and size. Powder bed fusion may be employed for the production of prototypes, tools, replacement parts, high value components or medical prostheses, such as, for example, dental or orthopaedic prostheses, on the basis of CAD data.

An apparatus which is suitable for producing a larger number of moulded bodies from pulverulent raw materials by a powder bed fusion process is described in DE 20 2013 009 787 U1. The prior art apparatus is provided with a work piece generating section comprising an irradiation device and a process chamber. The process chamber may be sealed against the ambient atmosphere and accommodates a carrier for receiving a raw material powder as well as a work piece that is generated from the raw material powder on the carrier by an additive layering process. The carrier is displaceable relative to the process chamber into a building chamber in order to compensate for an increasing height of the work piece upon being generated. The building chamber may be sealed against the ambient atmosphere by means of a cover and thereafter may be transferred from an operating position adjacent to the process chamber into an exchange position outside of the work piece generating section. From the exchange position, the building chamber is further transferred to a post-treatment and unpacking section. In the post-treatment and unpacking section, the work piece accommodated within the building chamber is cooled and the work piece finally is unpacked by lifting the carrier relative to the building chamber until the carrier is arranged substantially flush with an upper rim of the building chamber and the work piece can be removed from the carrier. A powder recovery system of the apparatus serves to discharge excess raw material powder from the building chamber and the process chamber, to treat and process the discharged powder and to finally return the powder to the process chamber.

The invention is directed at the object of providing an unpacking device for use in an apparatus for producing a three-dimensional work piece by irradiating layers of a raw material powder with electromagnetic or particle radiation which is suitable to unpack a three-dimensional work piece while reliably removing residual raw material powder sticking to the three-dimensional work piece. The invention further is directed at the object of providing a method of operating an unpacking device of this kind. Finally, the invention is directed at the object of providing an apparatus for producing a three-dimensional work piece by irradiating layers of a raw material powder with electromagnetic or particle radiation which is equipped with an unpacking device of this kind.

These objects are addressed by an unpacking device as defined in claim 1, a method of operating an unpacking device as defined in claim 12 and an apparatus for producing a three-dimensional work piece by irradiating layers of a raw material powder with electromagnetic or particle radiation as defined in claim 20.

An unpacking device for use in an apparatus for producing a three-dimensional work piece by irradiating layers of a raw material powder with electromagnetic or particle radiation comprises a holding device which is configured to hold a building chamber arrangement. In particular, the holding device may be configured to receive the building chamber arrangement, which may be transferred to the unpacking device by a translatory motion either in a vertical direction, a horizontal direction or any other suitable direction, and to hold the building chamber arrangement in a desired position. The holding device may be connected to a supporting structure of the unpacking device and may be adapted to attach the building chamber arrangement to the supporting structure. It is, however, also conceivable that the holding device forms a part of a movable device such as, for example, a crane which may also transfer the building chamber arrangement to the unpacking device.

The building chamber arrangement comprises a building chamber accommodating a carrier. The building chamber may, for example, have a cylindrical, in particular a circular cylindrical shape. The carrier is configured to receive a three-dimensional work piece produced from a raw material powder by an additive layering process and may, for example, be substantially plate-shaped.

During work piece production operation of the apparatus for producing three-dimensional work pieces by irradiating layers of a raw material powder with electromagnetic or particle radiation, a raw material powder layer may be applied onto the carrier of the building chamber arrangement and thereafter selectively irradiated with electromagnetic or particle radiation so as to cause heating and consequently melting or sintering of the raw material powder particles and thus the generation of a first layer of the three-dimensional work piece to be generated. Thereafter, the carrier may be lowered relative to the building chamber, i.e. the carrier may be lowered into the building chamber, thus allowing the application and irradiation of a further raw material powder layer. These steps may be repeated until the work piece has the desired shape and size. After completion of the work piece generation process, the generated three-dimensional work piece is supported on the carrier within the building chamber, typically embedded in residual raw material powder. It is, however, also conceivable that residual raw material powder which is applied onto the carrier, but not used for generating the three-dimensional work piece is already removed during the work piece generation process.

Preferably, the building chamber arrangement is configured to be detachably installed in the apparatus for producing three-dimensional work pieces by irradiating layers of a raw material powder with electromagnetic or particle radiation so that the building chamber arrangement can be transferred between different sections of the apparatus as described in DE 20 2013 009 787 U1. In a preferred embodiment, the unpacking device is adapted to form a part of a post-treatment and unpacking section of the apparatus for producing three-dimensional work pieces by irradiating layers of a raw material powder with electromagnetic or particle radiation to which the building chamber arrangement is transferred after completion of the work piece generation process for unpacking the generated three-dimensional work piece.

The unpacking device further comprises an engagement unit which is configured to engage with the carrier of the building chamber arrangement. For example, the engagement unit may comprise a supporting portion which is configured to interact with the carrier of the building chamber arrangement and to finally support the carrier thereon. Further, the engagement unit may comprise a connection portion which serves to connect the engagement unit to further components of the unpacking device as will be described in greater detail below. The connection portion may extend substantially perpendicular to the supporting portion. The engagement unit may comprise first latching elements which may be arranged on a supporting surface of the supporting portion which is configured to contact the carrier of the building chamber arrangement upon bringing the carrier into engagement with the engagement unit. The first latching elements may be configured to interact with complementary second latching elements which may be provided on a surface, in particular a lower surface of the carrier which is configured to contact the supporting surface upon bringing the carrier into engagement with the engagement unit.

The unpacking device further comprises a moving mechanism which is configured to cause a relative movement between the building chamber and the engagement unit with the carrier engaged therewith so as to allow a separation of the carrier with a three-dimensional work piece received thereon from the building chamber. The moving mechanism thus serves to separate the building chamber from the carrier and to thus expose the three-dimensional work piece received on the carrier. The moving mechanism may be configured to either move the building chamber relative to the engagement unit with the carrier engaged therewith or to move the engagement unit with the carrier engaged therewith relative to the building chamber. Further, it is also conceivable that the moving mechanism is configured to move both the building chamber and the engagement unit with the carrier engaged therewith so as to separate the carrier from the building chamber.

In case the moving mechanism is configured to move the building chamber relative to the carrier, the moving mechanism, may, for example, comprise a hydraulic system or another suitable system, which may cause a movement of the holding device holding the building chamber relative to the carrier. It is, however, also conceivable that the moving mechanism is integrated into a movable device such as, for example, a crane which may also transfer the building chamber arrangement to the unpacking device.

Finally, the unpacking device comprises a raw material powder removal mechanism which is configured to cause a vibration and/or a rotation of the engagement unit with the carrier engaged therewith so as to remove residual raw material powder from the three-dimensional work piece received on the carrier. Basically, most of the residual raw material powder which is present in the building chamber after completion of the work piece generation process, upon separating the carrier from the building chamber in the unpacking device, is gravity-driven released from the building chamber. The raw material powder removal mechanism however allows to also remove raw material powder particles which stick to surfaces of the three-dimensional work piece or which are received in recesses or bores provided in the three-dimensional work piece.

The unpacking device thus is suitable to automatically unpack a three-dimensional work piece from the building chamber arrangement, while residual raw material powder particles sticking to the three-dimensional work piece can be removed in a reliable manner. A post-treatment of the three-dimensional work piece for cleaning the work piece from residual raw material powder particles can thus be simplified or even dispensed with. This is particularly advantageous in case the residual raw material powder sticking to the three-dimensional work piece contains a material that should not be released to the ambient in an uncontrolled manner, for example oxygen sensitive metal particles. Finally, the residual raw material powder cleaned from the three-dimensional work piece in the unpacking device can be supplied to a powder recirculation system for receiving and processing residual raw material powder so as to prepare the residual raw material powder for reintroduction into the work piece production process.

In a preferred embodiment of the unpacking device, the holding device is configured to interact with an outer surface of the building chamber. For example, the holding device may comprise a pair of gripping arms which is suitable to interact with corresponding protrusions protruding from an outer surface of the building chamber so as to hold the building chamber arrangement in a desired position in the unpacking device. A holding device which interacts with the outer surface of the building chamber does not interfere with the separation of the carrier with the three-dimensional work piece received thereon from the building chamber.

The moving mechanism may be configured to lift the building chamber so as to separate the carrier from the building chamber, while the carrier with the engagement unit engaged therewith is maintained in place. It is, however, also conceivable that the moving mechanism is configured to lower the engagement unit with the carrier engaged therewith so as to separate the carrier from the building chamber, while the building chamber is maintained in place. Finally, also a combined movement of the building chamber and the engagement unit with the carrier engaged therewith, i.e. a lifting of the building chamber and a lowering of the engagement unit and the carrier is conceivable so as to achieve a separation of the carrier from the building chamber.

The moving mechanism of the unpacking device may further be configured to cause a relative movement between the building chamber arrangement and engagement unit so as to bring the engagement unit into engagement with the carrier. The moving mechanism then fulfills the double function to not only cause a separation of the building chamber from the carrier so as to expose the three-dimensional work piece, but to also provide for an approach of the building chamber arrangement and engagement unit so as to bring the engagement unit into contact and finally engagement with the carrier. The moving mechanism may be configured to either move the building chamber arrangement relative to the engagement unit or to move the engagement unit relative to the building chamber arrangement. Further, it is also conceivable that the moving mechanism is configured to move both the building chamber arrangement and the engagement unit so as to bring the engagement unit into engagement with the carrier.

The moving mechanism may be configured to lower the building chamber arrangement so as to bring the engagement unit into engagement with the carrier, while the engagement unit is maintained in place. It is, however, also conceivable that the moving mechanism is configured to lift the engagement unit so as to bring the engagement unit into engagement with the carrier, while the building chamber arrangement is maintained in place. Finally, also a combined movement of the building chamber arrangement and the engagement unit, i.e. a lowering of the building chamber arrangement and a lifting of the engagement unit is conceivable so as to bring the engagement unit into engagement with the carrier.

The raw material powder removal mechanism may comprise a rotatable shaft. The rotatable shaft may be attached to the engagement unit. In particular, the rotatable shaft may be attached to the connecting portion of the engagement unit. Further, the rotatable shaft may be connected to a driving motor, for example an electric motor, which may be configured to cause a rotational movement of the rotational shaft so as to rotate the engagement unit with the carrier engaged therewith. The raw material powder removal mechanism may be configured to rotate the engagement unit with the carrier engaged therewith only over a certain limited angular range, for example an angular range of approximately 180°. Such a limited rotation of the engagement unit and the carrier would be sufficient to turn the carrier and the three-dimensional work piece received thereon upside down and to thus allow an additional gravity-driven removal of residual raw material powder from the work piece. It is, however, also conceivable that the raw material powder removal mechanism is configured to rotate the engagement unit with the carrier engaged therewith over a full angular range of 360°.

Alternatively or additionally thereto, the powder removal mechanism may comprise a vibration motor which is connected to the engagement unit and which is configured to cause a vibration of the engagement unit with the carrier engaged therewith. The vibration motor may be connected to the connecting portion and/or the supporting portion of the engagement unit. The vibrations caused by the vibration motor should have an amplitude and a frequency which are suitable to release residual raw material powder particles sticking to the three-dimensional work piece received on the carrier. The amplitude and the frequency of the vibrations should, however, be selected so as to ensure that the three-dimensional work piece is not unintentionally released from the carrier.

The unpacking device may further comprise a powder collection device which is configured to collect residual raw material powder removed from the three-dimensional work piece by means of the raw material powder removal mechanism. For example, the powder collection device may comprise a vessel or another receptacle which may be placed below the engagement unit, at least when the raw material powder removal mechanism is operated so as to release residual raw material powder particles from the three-dimensional work piece.

In a preferred embodiment of the unpacking device, the engagement unit is arranged in a receiving box. The receiving box may be sealed against the ambient atmosphere and may be connected to a suitable atmosphere control system which is adapted to establish a desired atmosphere, for example an inert gas atmosphere, within the receiving box. Further, the receiving box may be accessible via a lock which is configured to maintain a controlled atmosphere within the receiving box during engagement of the engagement unit with the carrier of the building chamber arrangement, i.e. during lowering the building chamber arrangement in the direction of the engagement unit and/or during lifting the engagement unit in the direction of the building chamber arrangement, during separation of the carrier with the three-dimensional work piece received thereon from the building chamber, i.e. during lifting the building chamber in a direction facing away from the carrier engaged with engagement unit and/or during lowering the engagement unit with the carrier engaged therewith in a direction facing away from the building chamber, and during removal of the residual raw material powder from the three-dimensional work piece received on the carrier, i.e. during operation of the raw material powder removal mechanism. The provision of a sealed receiving box is particularly advantageous for processing residual raw material powder which contains a material that should not be released to the ambient in an uncontrolled manner, for example oxygen sensitive metal particles.

In a preferred embodiment, the receiving box is designed in the form of a glove box which is provided with at least one gripping glove. Via the at least one gripping glove, a user may handle the three-dimensional work piece and/or residual raw material powder which still sticks to the three-dimensional work piece or which already is received in the receiving box, in particular the powder collection device.

Finally, the unpacking device may comprise a suction system which is configured to withdraw residual raw material powder from the three-dimensional work piece received on the carrier, the receiving box and/or the powder collection device. The suction system may comprise a flexible suction tube which is sealingly guided into the receiving box such that it can be positioned and handled as desired by a user, for example via the at least one gripping glove. The suction tube may be connected to a powder recirculation system for receiving and processing residual raw material powder so as to prepare the residual raw material powder for reintroduction into the work piece production process.

The building chamber arrangement may further be arrangeable in and/or connectable or exposable to a controlled atmosphere prior to engaging it with the engagement unit and, in particular, prior to arranging it in a receiving box as previously discussed. For doing so, the holding device may be arranged and/or be arrangeable in a space which is sealed against the ambient atmosphere. Furthermore, said space may be connected to a suitable atmosphere control system which is adapted to establish a desired atmosphere in said space, for example an inert gas atmosphere. Preferably, the controlled atmosphere corresponds to an atmosphere within the receiving box of the unpacking device.

Furthermore, the holding device (or the space in which it is arranged) may connect to or be connectable to the receiving box in a sealed and, in particular, in a gas-tight manner. This is preferably done prior to opening a lock of the receiving box, said lock providing an access to the engagement unit while maintaining a controlled atmosphere within the receiving box. Also, opening said lock for accessing the receiving box may only be carried out after the building chamber arrangement has been exposed to a controlled atmosphere and, preferably, to an atmosphere corresponding to the atmosphere within the receiving box. Note that the formulation "opening the lock" may generally denote rendering an interior of the receiving box and, in particular, the engagement unit accommodated therein accessible from outside.

In sum, a space may be provided around the building chamber arrangement and/or holding device for setting a controlled atmosphere therein. Said space may at least partially surround the building chamber arrangement and/or holding device, in particular prior to engaging the building chamber arrangement with the engagement unit. Also, said space may accommodate at least part of the moving mechanism.

Further, said space may comprise a connecting portion which, for example, comprises an opening or aperture for connecting to the receiving box in a fluidically-conducting manner. In the connected state, the lock may be arranged between the receiving box and the space in such a manner that a fluidic connection can be established between said box and space, preferably while keeping an interior of the receiving box sealed from the ambient atmosphere.

The space may be partially or completely defined by a supporting structure of the unpacking device to which the holding device is attached. Said supporting structure may be connected to the receiving box in a non-movable manner. Also, the space may be defined by a cover member, such as a dome- or bell-shaped member in which the building chamber arrangement and/or holding device is arranged or is arrangeable. Said cover member may be separately configured from the receiving box. Also, said cover member may be movable relative to the receiving box, e.g. so as to be selectively arrangeable in a predetermined connecting position relative thereto.

Specifically, the cover member may be configured to pick up the building chamber arrangement from a position outside of the unpacking device, e.g. via connecting it to the holding device. Following that, the cover member may transport the building chamber arrangement to a predetermined connecting position relative to the receiving box. This may be achieved by connecting the cover member to a movement device, such as a crane (in particular an overhead crane) an industrial robot, a gantry system or the like.

The unpacking device may further comprise a sealing unit for sealingly connecting the space around the building chamber arrangement and/or holding device to the receiving box (and in particular to the engagement unit arranged therein). This may be done in a gas-tight manner. The sealing unit may be selectively activated, for example, prior to opening the lock of the receiving box and/or prior to setting a controlled atmosphere in the space. Also, the sealing unit may comprise an actuated portion, such as a selectively extendable portion, for sealingly connecting the receiving box and the space (e.g. an extendable bellow or an inflatable sealing lip). The sealing unit may, at least in a retracted state, be arranged at or fixed to at least one of the receiving box or space. If comprising an extendable portion, said portion may then be extended towards the respective other of the receiving box or space to achieve the desired sealing effect.

In one example, the space is defined by a cover member housing the holding device. The cover member is movable relative to the receiving box while the holding device holds a building chamber arrangement, e.g. by means of an overhead crane. After being arranged in a predetermined position relative to the receiving box, a sealing unit may be activated, for example by extending a bellow arranged at an outer side of the receiving box towards the cover member to establish a sealed connection between the cover member and receiving box. Following that, a controlled atmosphere may be set within the space defined by the cover member, e.g. an inert gas atmosphere. The controlled atmosphere preferably corresponds to the atmosphere within the receiving box. The lock of the receiving box may then be opened to render the engagement unit accommodated therein accessible. Said lock may generally be arranged within the sealed space between the cover member and receiving box which is enclosed by the sealing unit. Following that, the engagement unit and building chamber arrangement may be engaged with one another without exposing any of these members to the ambient atmosphere. This may be achieved by means of a moving mechanism discussed above Overall, exposing the interior of the receiving box to the ambient atmosphere can thus be avoided, for example, since the lock is opened only after establishing the above discussed sealed connection. Also, if establishing the same controlled atmosphere in the space around the holding device and/or building chamber arrangement as in the receiving box, less efforts are required for maintaining a controlled atmosphere within the receiving box. Note that said space around the holding device and/or building chamber arrangement may be smaller than the space within the receiving box (e.g. amounting to at most ca. 50% or at most ca. 25% of the volume enclosed by the receiving box). Thus, setting a respective atmosphere within said space can be carried out rather quickly compared to setting or maintaining an atmosphere within the receiving box.

Further, the sealed connection between the receiving box and the building chamber arrangement and/or holding device (or the space in which these members are arranged) may at least be maintained until the powder removal within the receiving box is completed. Afterwards, the unpacked work piece can be removed from the receiving box, e.g. by again connecting it to the holding device. Only after the lock of the receiving box has been closed again with the work piece being removed from the engagement unit, the sealed connection may again be removed e.g. by retracting the extendable portion of the sealing unit.

A method of operating an unpacking device for use in an apparatus for producing a three-dimensional work piece by irradiating layers of a raw material powder with electromagnetic or particle radiation comprises a step of holding a building chamber arrangement by means of a holding device. The building chamber arrangement comprises a building chamber accommodating a carrier, wherein the carrier is configured to receive a three-dimensional work piece produced from a raw material powder by an additive layering process. An engagement unit is engaged with the carrier of the building chamber arrangement. A relative movement between the building chamber and the engagement unit with the carrier engaged therewith is caused by means of a moving mechanism so as to allow a separation of the carrier with a three-dimensional work piece received thereon from the building chamber. Finally, a vibration and/or a rotation of the engagement unit with the carrier engaged therewith is caused by means of a raw material powder removal mechanism so as to remove residual raw material powder from the three-dimensional work piece received on the carrier.

The holding device may interact with an outer surface of the building chamber. The building chamber may be lifted so as to separate the carrier from the building chamber. Alternatively or additionally thereto, the engagement unit with the carrier engaged therewith may be lowered so as to separate the carrier from the building chamber.

The method of operating an unpacking device may further comprise the step of causing a relative movement between the building chamber arrangement and the engagement unit by means of the moving mechanism so as to bring the engagement unit into engagement with the carrier. The moving mechanism may lower the building chamber arrangement so as to bring the engagement unit into engagement with the carrier. Alternatively or additionally thereto, the engagement unit may be lifted by means of the moving mechanism so as to bring the engagement unit into engagement with the carrier.

The raw material powder removal mechanism may comprise a rotatable shaft which is attached to the engagement unit and which is connected to a driving motor. A driving motor may cause a rotational movement of the rotatable shaft so as to rotate the engagement unit with the carrier engaged therewith. Alternatively or additionally thereto, the powder removal mechanism may comprise a vibration motor which is connected to the engagement unit and which causes a vibration of the engagement unit with the carrier engaged therewith.

The method of operating an unpacking device may further comprise the step of collecting residual raw material powder removed from the three-dimensional work piece by means of the raw material powder removal mechanism. Furthermore, a controlled atmosphere may be maintained within a sealed receiving box accommodating the engagement unit during engagement of the engagement unit with the carrier of the building chamber arrangement, during separation of the carrier with the three-dimensional work piece received thereon from the building chamber and during removal of residual raw material powder from the three-dimensional work piece received on the carrier by means of a lock providing access to the receiving box. Preferably, the receiving box is designed in the form of a glove box which is provided with at least one gripping glove. Residual raw material powder may be withdrawn from the three-dimensional work piece received on the carrier, the receiving box and/or the powder collection device by means of a suction system.

The method may further comprise the step of exposing the building chamber arrangement and/or the holding device to an atmosphere that is sealed from the surrounding. Specifically, the building chamber arrangement and/or the holding device may be exposed to a controlled atmosphere (e.g. an inert gas atmosphere), said atmosphere preferably corresponding to an atmosphere within the receiving box. For doing so, the building chamber arrangement and/or holding device may be arranged in a space containing a respective atmosphere in which such an atmosphere can be set. As discussed above, said space may be defined by a supporting structure of the unpacking device or by a cover member.

Any of these steps may be carried out prior to engaging the building chamber arrangement with the engagement unit. Specifically, the method may further comprise the step of connecting the building chamber arrangement and/or holding device to the receiving box in a fluidically-conducting manner, e.g. by opening the lock of the receiving box. This is preferably done after the atmosphere to which the building chamber arrangement and/or holding device are exposed has been controlled in the above manner.

Moreover, prior or in parallel to forming said connection, the space accommodating the building chamber arrangement and/or the holding device may be sealingly connected to the receiving box, e.g. via a sealing unit as discussed above. This may include moving the building chamber arrangement and/or the holding device (or the space accommodating these elements) to a predetermined position relative to the receiving box. Following that, the sealing unit may be actuated to provide the sealing effect, e.g. by extending an extendable portion thereof.

Also, the method may further comprise the step of opening a lock of the receiving box only after exposing the building chamber arrangement and/or the holding device to the above-discussed controlled atmosphere and/or after providing a sealing connection between the receiving box and the space accommodating the building chamber arrangement and/or the holding device.

Finally, the method may also comprise an initial step of picking up the building chamber arrangement from a remote position, e.g. by a cover member comprising the holding device as discussed above, to then move it to a predetermined relative position to the receiving box.

An apparatus for producing a three-dimensional work piece by irradiating layers of a raw material powder with electromagnetic or particle radiation comprises an above-described unpacking device.

Preferred embodiments of the invention in the following are explained in greater detail with reference to the accompanying schematic drawing, in which.

Figure 1:
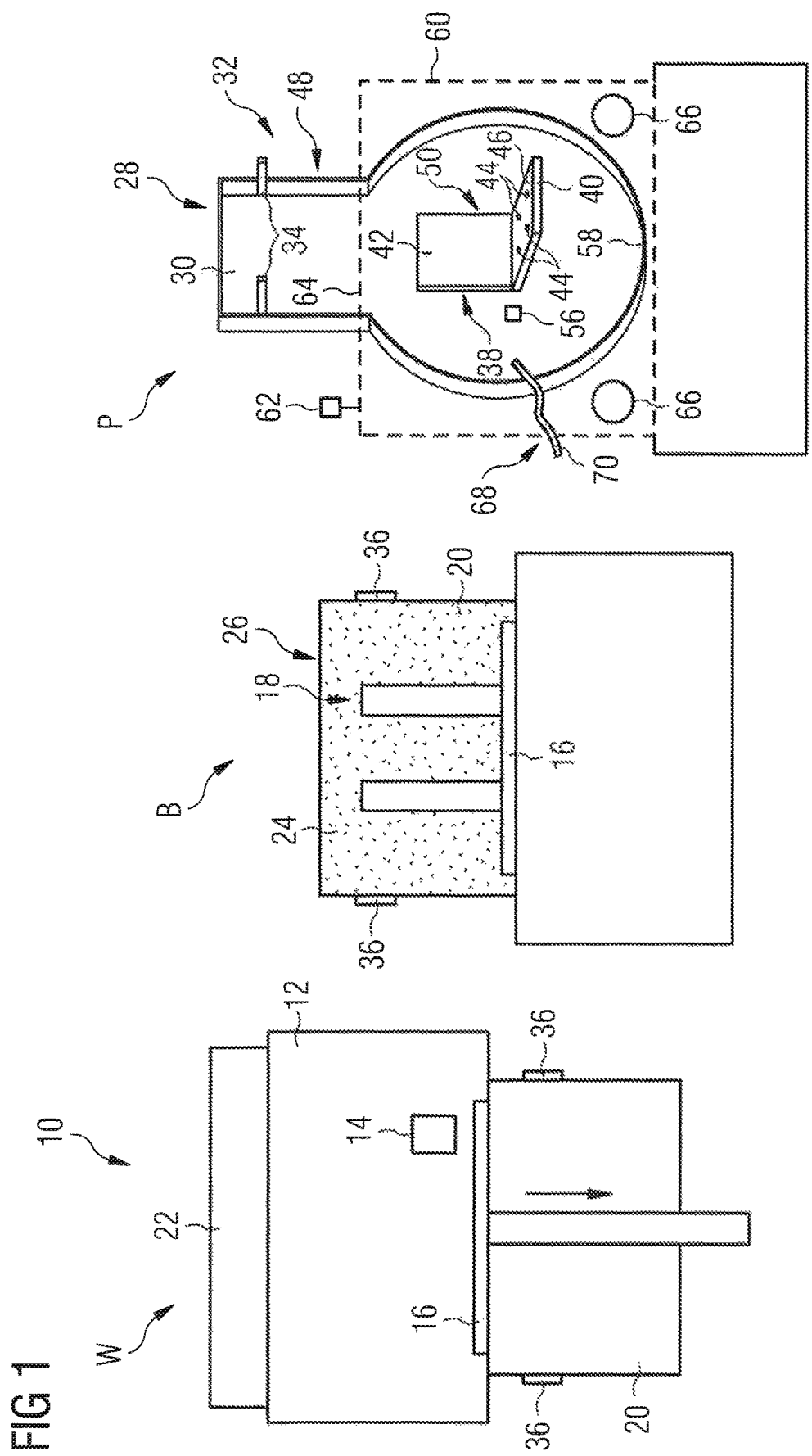
FIG. 1 shows an apparatus for producing a three-dimensional work piece by irradiating layers of a raw material powder with electromagnetic or particle radiation which is equipped with an unpacking device.

FIG. 1 shows an apparatus 10 for manufacturing a three-dimensional work piece 18 by an additive layer construction method. The apparatus 10 comprises a work piece generating section W which is equipped with a process chamber 12. A powder application device 14, which is disposed in the process chamber 12, serves to apply a raw material powder onto a carrier 16. The process chamber 12 is sealable against the ambient atmosphere, i.e. against the environment surrounding the process chamber 12. The carrier 16 is designed to be displaceable in a vertical direction so that, with increasing construction height of a work piece 18, as it is built up in layers from the raw material powder on the carrier 16, the carrier 16 can be moved downwards in the vertical direction into a building chamber 20.

The apparatus 10 further comprises an irradiation device 22 for selectively irradiating electromagnetic or particle radiation, in particular laser radiation, onto the raw material powder applied onto the carrier 16. A laser source of the irradiation device 22, in particular a diode pumped Ytterbium fibre laser, emits laser light having a wavelength of approximately 1070 to 1080. The irradiation device 22 further comprises an optical unit for guiding and processing the radiation beam. The optical unit may comprise a beam expander for expanding the radiation beam, a scanner and an object lens. Alternatively, the optical unit may comprise a beam expander including a focusing optic and a scanner unit. By means of the scanner unit, the position of the focus of the radiation beam both in the direction of the beam path and in a plane perpendicular to the beam path can be changed and adapted. The scanner unit may be designed in the form of a galvanometer scanner and the object lens may be an f-theta object lens.

During work piece generation operation of the apparatus 10, a first layer of a three-dimensional work piece 18 to be produced is generated on the carrier 16 by selectively irradiating the raw material powder layer applied onto the carrier 16 with the radiation beam. Specifically, the radiation beam is directed over the raw material powder layer applied onto the carrier 16 in accordance with CAD data of the work piece 18 to be produced. After the first layer of the work piece 18 to be produced is completed, the carrier 16 is lowered in a vertical direction allowing the application of a successive powder layer by means of the powder application device 14. Thereafter, the successive powder layer is irradiated by means of the irradiation device 22. Thus, layer by layer, the component is built up on the carrier 16, while the carrier 16 is lowered into the building chamber 20. The work piece 18 generated on the carrier 16, in the building chamber 20, is embedded in residual raw material powder 24 which, during the work piece generation process, is applied onto the carrier 16, but not irradiated.

After completion of the work piece generation process in the work piece generating section W of the apparatus 10, the building chamber 20 with the generated three-dimensional work piece 18 is sealed by means of a cover. Thereafter, a building chamber arrangement 26 which comprises the carrier 16 with the work piece 18 received thereon and the building chamber 20 is transferred from an operating position in the work piece generating section W adjacent to the process chamber 12 into an exchange position in a building chamber exchange section B of the apparatus 10. As soon as the building chamber arrangement 26 has been transferred to the building chamber exchange section B, an exchange carrier and an exchange building chamber (not shown) can be installed in the work piece generating section W and a further work piece generation process can be started.

From the exchange position in the building chamber exchange section B, the building chamber arrangement 26 is further transferred to a post-treatment and unpacking section P. In the post-treatment and unpacking section P, the work piece 18 accommodated within the building chamber 20 is finally unpacked from the building chamber arrangement 26 as will be described in more detail below.

The post-treatment and unpacking section P of the apparatus 10 is equipped with an unpacking device 28. As becomes apparent from FIG. 2, the building chamber arrangement 26 may be transferred from the building chamber exchange section B to the unpacking device 28 of the unpacking section P by a translatory motion in a horizontal direction. It is, however, also conceivable to transfer the building chamber arrangement 26 to the unpacking device 28 by a translatory motion in a vertical direction. The unpacking device 28 comprises a supporting structure 30 to which a holding device 32 is attached. The holding device 32 is configured to hold the building chamber arrangement 26 and in particular is configured to interact with an outer surface of the building chamber 20. In the embodiment of an unpacking device 28 shown in the drawings, the holding device 32 comprises two gripping arms 34 which are suitable to interact with corresponding protrusions 36 protruding from an outer surface of the building chamber 20 so as to hold the building chamber arrangement 26 in a desired position in the unpacking device 28.

Figure 4:
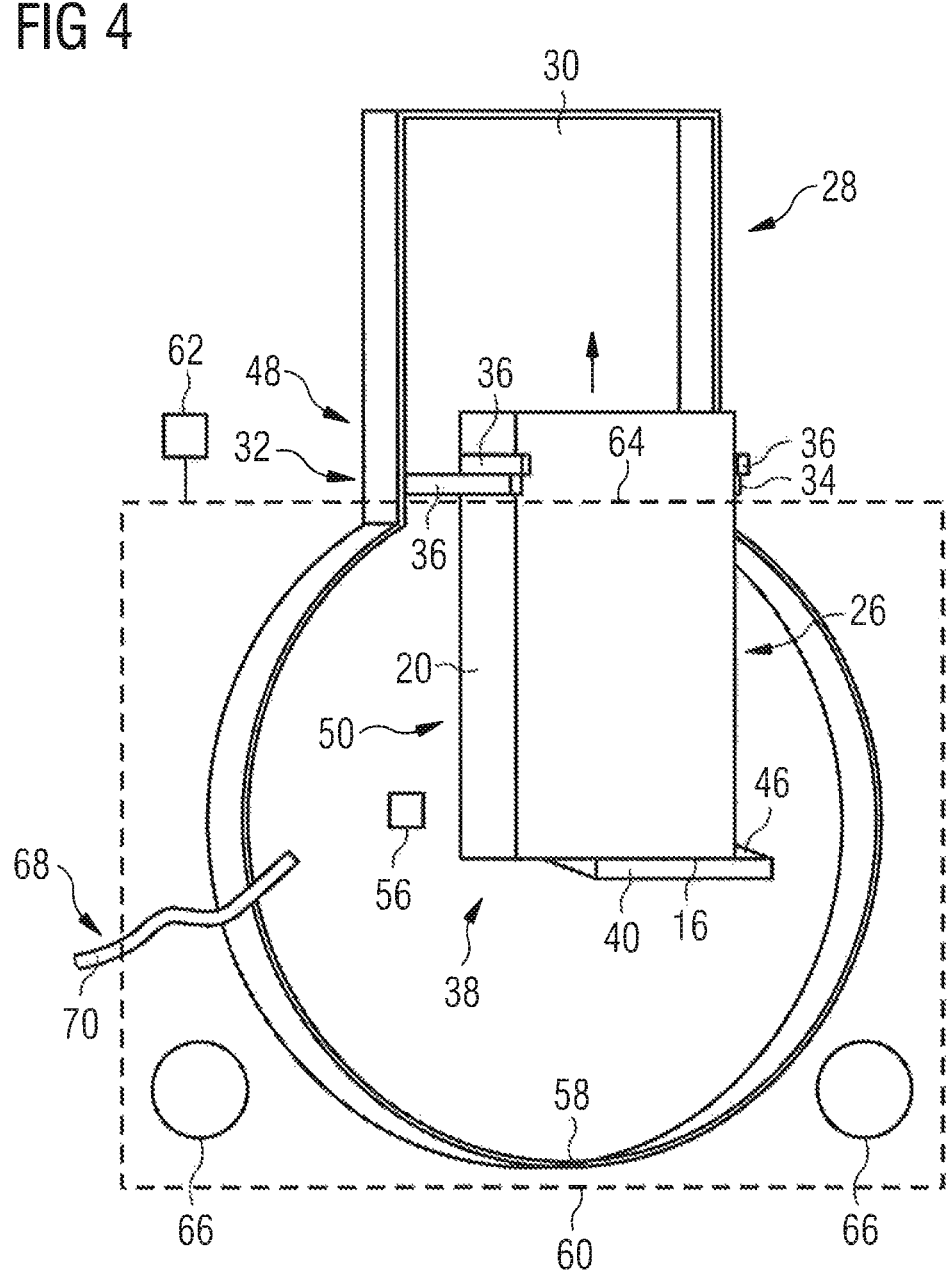

The unpacking device 28 further comprises an engagement unit 38 which is configured to engage with the carrier 16 of the building chamber arrangement 26, see FIG. 4. The engagement unit 38 comprises a supporting portion 40 and a connection portion 42 which extends substantially perpendicular to the supporting portion 40. The connection portion 42 is connected to the supporting structure 30 so as to attach the engagement unit 38 to the supporting structure 30. First latching elements 44 are arranged on a supporting surface 46 of the supporting portion 40 which is configured to contact the carrier 16 of the building chamber arrangement 26 upon bringing the carrier 16 into engagement with the engagement unit 38. The first latching elements 44 are configured to interact with complementary second latching elements (not shown) which are provided on a lower surface of the carrier 16 which is configured to contact the supporting surface 46 upon bringing the carrier 16 into engagement with the engagement unit 38 as will be described in further detail below.

The unpacking device 28 further comprises a moving mechanism 48 which is configured to cause a relative movement between the building chamber 20 and the engagement unit 38 with the carrier 16 engaged therewith so as to allow a separation of the carrier 16 with the three-dimensional work piece 18 received thereon from the building chamber 20. Furthermore, the moving mechanism 48 is configured to cause a relative movement between the building chamber arrangement 26 and the engagement unit 38 so as to bring the engagement unit 38 into engagement with the carrier 16.

Figure 2:
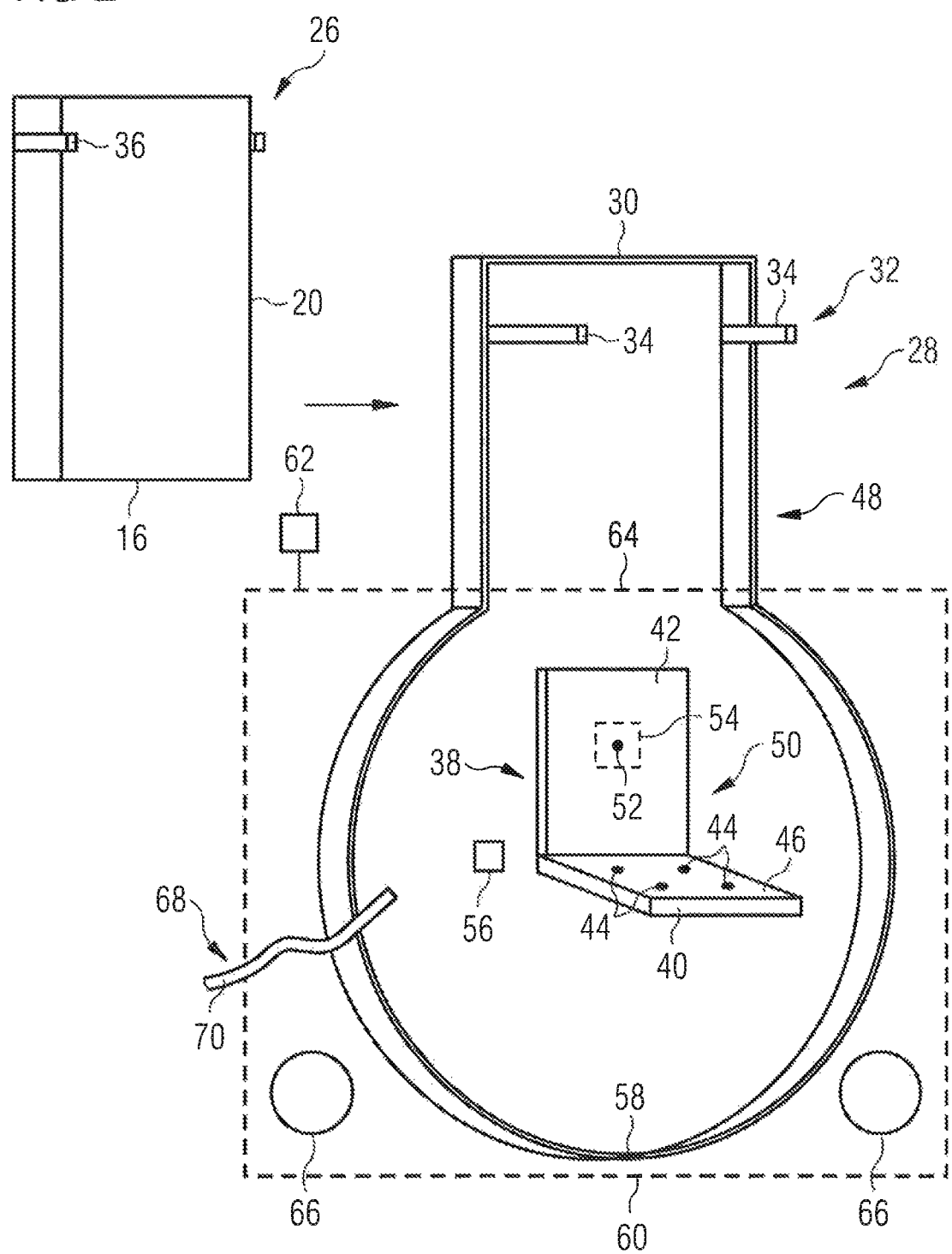
FIGS. 2 to 5 illustrate the operation of the unpacking device of the apparatus depicted in FIG. 1.
Figure 3:
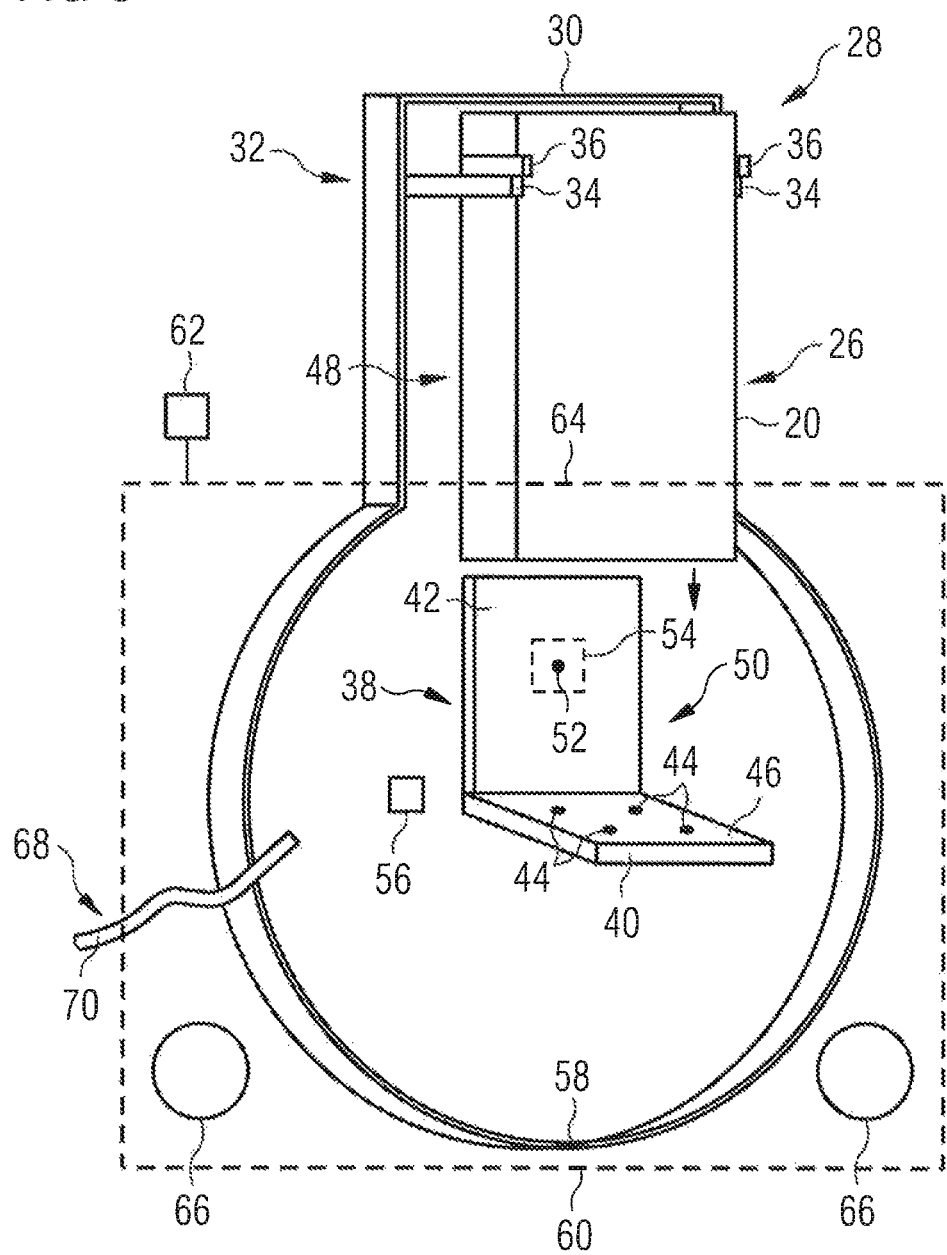

In the embodiment of an unpacking device 28 shown in the drawings, the moving mechanism 48 comprises a hydraulic system (not shown) which allows the gripping arms 34 of the holding device 32 to perform a guided movement relative to the supporting structure 30 so as to move the building chamber arrangement 26 relative to the supporting structure 30 and the engagement unit 38. In particular, as shown in FIGS. 2 and 3, the building chamber arrangement 26, by means of the moving mechanism 48, is lowered relative to the engagement unit 38 while the engagement unit 38 stays in place until the lower surface of the carrier 16 comes into contact with the supporting surface 46 formed on the supporting portion 40 of the engagement unit 38 and the first latching elements 44 engage with the complementary second latching elements provided on the lower surface of the carrier 16. As a result, the carrier 16 of the building chamber arrangement 26 is fixed to the engagement unit 38, i.e. to the supporting portion 40 of the engagement unit 38.

As an alternative, it is, however, also conceivable to equip the unpacking device 28 with a moving mechanism 48 which comprises, for example, a hydraulic system which lifts the engagement unit 38 relative to the building chamber arrangement 26 while the building chamber arrangement 26 stays in place until the first latching elements 44 provided on the supporting surface 46 engage with the second latching elements provided on the lower surface of the carrier 16 and hence fix the carrier 16 of the building chamber arrangement 26 to the engagement unit 38. Finally, the moving mechanism 48 may be configured to cause both a lowering movement of the building chamber arrangement 26 and a lifting movement of the engagement unit 38 until the carrier 16 of the building chamber arrangement 26 engages with the supporting portion 40 of the engagement unit 38 as described above.

Further, it is also conceivable to equip the unpacking device 28 with a moving mechanism 48 that is integrated into a movable device such as, for example, a crane which may also transfer the building chamber arrangement 26 to the unpacking device 28.

After the connection between the carrier 16 of the building chamber arrangement 26 and the engagement unit 38 has been established, the moving mechanism 48 causes a relative movement between the building chamber 26 and the engagement unit 38 with the carrier 16 engaged therewith so as to allow a separation of the carrier 16 with the three-dimensional work piece 18 received thereon from the building chamber 20. In the embodiment of an unpacking device 28 shown in the drawings, the moving mechanism 48, i.e. its hydraulic system, lifts the building chamber 20, while the engagement unit 38 with the carrier 16 fixed thereto stays in place until the three-dimensional work piece 18 received on the carrier 16 is exposed, see FIG. 5.

As an alternative, it is, however, also conceivable to equip the unpacking device 28 with a moving mechanism 48 which lowers the engagement unit 38 with the carrier 16 engaged therewith relative to the building chamber 20 while the building chamber 20 stays in place until the three-dimensional work piece 18 received on the carrier 16 is exposed. Finally, the moving mechanism 48 may be configured to cause both a lifting movement of the building chamber 20 and a lowering movement of the engagement unit 38 and the carrier 16 until the three-dimensional work piece 18 received on the carrier 16 is exposed. Upon separating the carrier 16 from the building chamber 20 in most of the residual raw material powder contained in the building chamber 20 is gravity-driven released from the building chamber 20.

However, in order to remove also raw material powder particles which stick to surfaces of the three-dimensional work piece 18 or which are received in recesses or bores provided in the three-dimensional work piece 18, the unpacking device 28 further comprises a raw material powder removal mechanism 50 which is configured to cause a vibration and/or a rotation of the engagement unit 38 with the carrier 16 engaged therewith. In the embodiment of an unpacking device 28 shown in the drawings, the raw material removal mechanism 50 comprises a rotatable shaft 52 having a first end which is attached to the engagement unit 38, i.e. to the connecting portion 42 of the engagement unit 38. A second end of the rotatable shaft 52 is connected to a driving motor 54 which designed in the form of an electric motor and which is shown in dashed lines in FIGS. 2 and 3.

Figure 5:
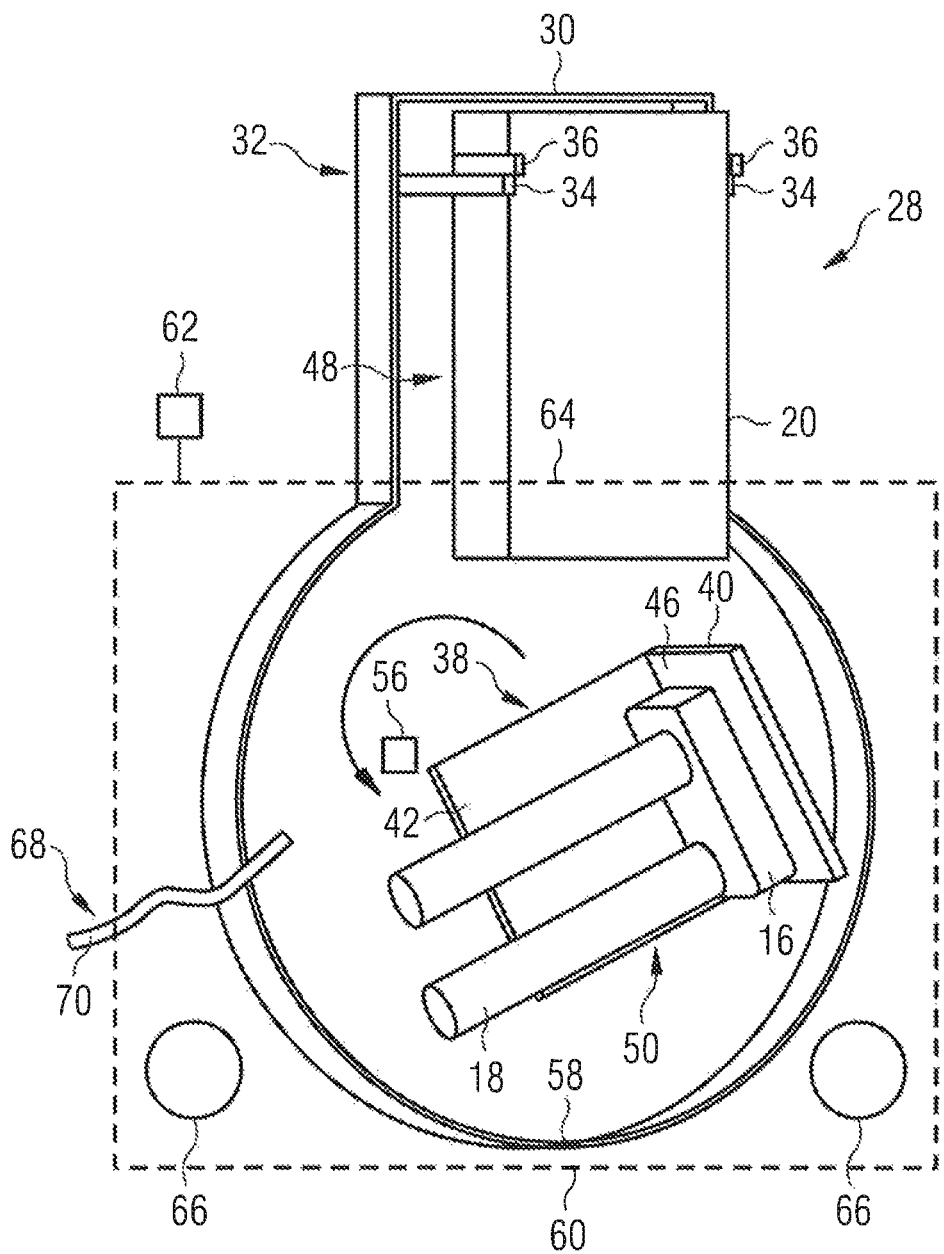

The driving motor 54 is configured to cause a rotational movement of the rotatable shaft 52 so as to rotate the engagement unit 38 the carrier 16 engaged therewith, so as to turn the carrier 16 with the three-dimensional work piece 18 received thereon upside down, see FIG. 5. Thus, residual raw material powder particles sticking to the three-dimensional work piece 18 are gravity-driven released from the work piece 18. Furthermore, the raw material powder removal mechanism 50 comprises a vibration motor 56 which is connected to the engagement unit 38 and which is configured to cause a vibration of the engagement unit 38 with the carrier 16 engaged therewith. The vibrations caused by the vibration motor 56 have an amplitude and a frequency which are suitable to release residual raw material powder particles which are still sticking to the three-dimensional work piece 18 although the work piece 18 is turned upside down, but are also selected so as to ensure that the three-dimensional work piece 18 is not unintentionally released from the carrier 16.

The residual raw material powder released from the building chamber 20 and the three-dimensional work piece 18 is collected in a powder collection device 58. The powder collection device 58 is placed below the engagement unit 38. Thus, raw material powder particles which are released from the work piece 18 during operation of the raw material powder removal mechanism 50 can easily be collected in the powder collection device 58.

In the embodiment of an unpacking device 28 shown in the drawings, the engagement unit 38 is arranged in a receiving box 60. The receiving box 60 is sealed against the ambient atmosphere and is connected to a suitable atmosphere control system 62 which is adapted to establish a desired atmosphere, for example an inert gas atmosphere, within the receiving box 60. Further, the receiving box 60 is accessible via a lock 64 which is configured to maintain a controlled atmosphere within the receiving box 60 during engagement of the engagement unit 38 with the carrier 16 of the building chamber arrangement 26, i.e. during lowering the building chamber arrangement 26 in the direction of the engagement unit 38, during separation of the carrier 16 with the three-dimensional work piece 18 received thereon from the building chamber 20, i.e. during lifting the building chamber 20 in a direction facing away from the carrier 16 engaged with engagement unit 38, and during removal of the residual raw material powder from the three-dimensional work piece 18 received on the carrier 16, i.e. during operation of the raw material powder removal mechanism 50.

The receiving box 60 is designed in the form of a glove box which is provided with a pair of gripping gloves 66. Via the gripping glove 66, a user may handle the three-dimensional work piece 18 and/or residual raw material powder which still sticks to the three-dimensional work piece 18 or which already is received in the receiving box 60, in particular the powder collection device 58. Finally, a suction system 68 is provided which is configured to withdraw residual raw material powder from the three-dimensional work piece 18 received on the carrier 16, the receiving box 60 and/or the collection device 58. The suction system 68 comprises a flexible suction tube 70 which is sealingly guided into the receiving box 60 such that it can be positioned and handled as desired by a user, for example via the gripping gloves 66. The suction tube 70 may be connected to a powder recirculation system for receiving and processing residual raw material powder (not shown) so as to prepare the residual raw material powder for reintroduction into the work piece production process.

According to an alternative non-illustrated embodiment, the portion of the supporting structure 30 of the unpacking device 28 of FIG. 2 which is arranged outside of the lock 64 may define a space in which a controlled atmosphere can be set. This way, the building chamber arrangement 26 as well as the holding device 32 can be exposed to a controlled atmosphere prior to opening the lock 64. This atmosphere corresponds to the atmosphere within the receiving box 60. This may require moving the building chamber arrangement 26 to the holding device 32 by means of a separate movement unit, such as an overhead crane or industrial robot. For arranging the building chamber arrangement 26 at the holding device 32, the respective portion of the supporting structure 30 may comprise an access door or gate. Other than that, said portion surrounds the holding device 32 and building chamber arrangement 26 on five sides apart from an opened underside facing the lock of the receiving box.

Moreover, according to said non-illustrated embodiment, the space defined by the respective portion of the supporting structure 30 is connected to the receiving box 60 in a sealed manner from the ambient atmosphere. This may be achieved by connecting the opened underside and the lock of the receiving box by a tunnel-like sealing unit (see also sealing unit discussed below with regard to FIG. 6). Thus, after having controlled the atmosphere within said space so as to match the atmosphere within the receiving box 60, the lock 64 can be opened to render the engagement unit 38 accessible without, however, exposing the interior of the receiving box 60 to the ambient atmosphere.

Figure 6:
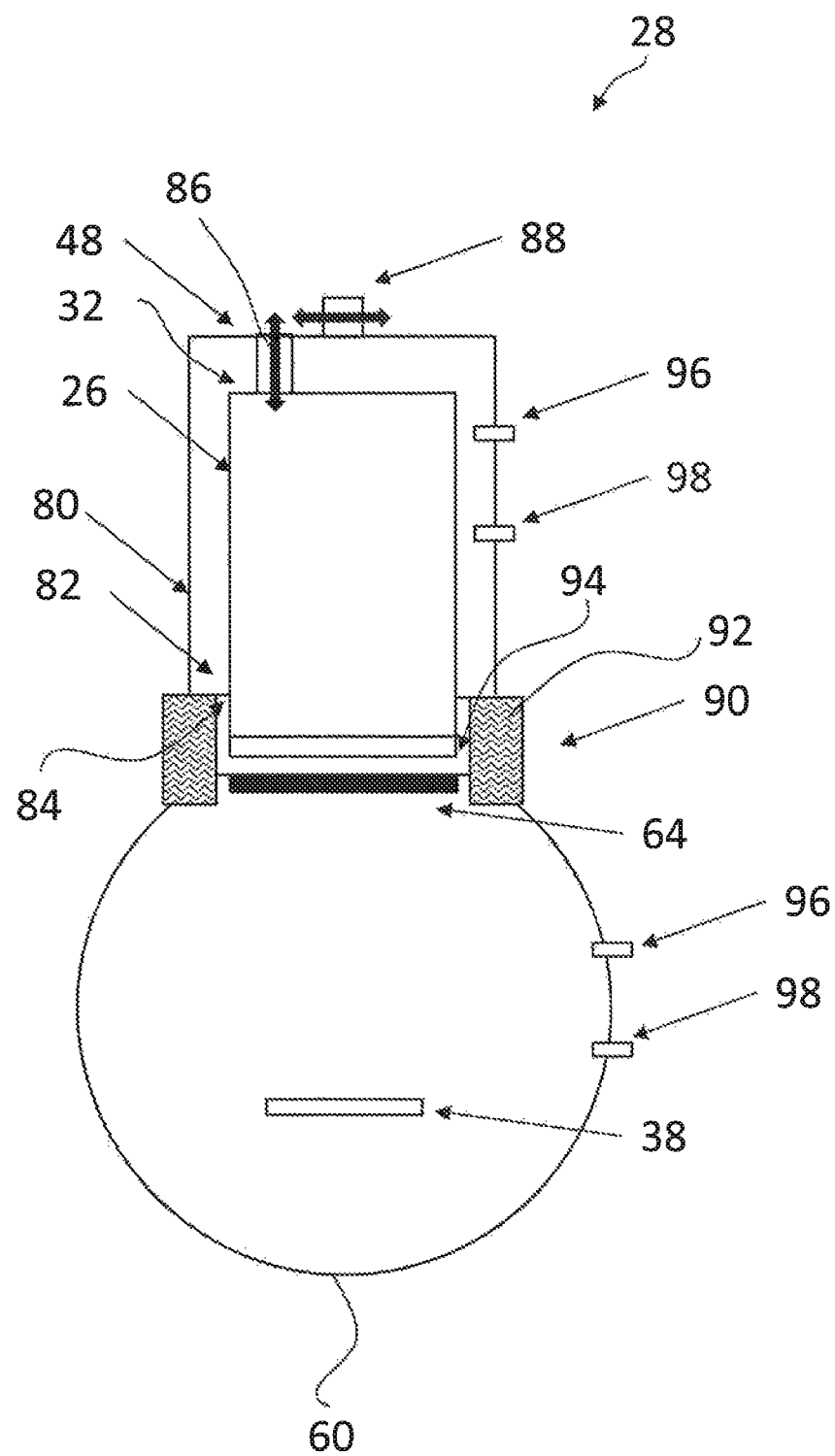
FIG. 6 illustrates the operation of an unpacking device according to a further embodiment.

FIG. 6 shows a further embodiment of an unpacking device 28 comprising a separate cover member 80. Said cover member 80 encloses a space 82 which is approximately similar to the space enclosed by the portion of the supporting structure 30 of the unpacking device 28 of FIG. 2 which is arranged outside of the lock 64. Specifically, said cover member 80 is formed as a hollow and, figuratively speaking, bell-shaped member having an opened underside 84 facing the receiving box 60. Said opened underside 84 forms a connecting portion to the receiving box 60.

In the depicted state, the building chamber arrangement 26 is arranged in an initial position prior to being lowered into the receiving box 60 for connecting with the engagement unit 38. One can see that the building chamber arrangement 26 slightly projects beyond the cover member 80 by extending through its opened underside 84.

The space 82 enclosed by the cover member 80 (i.e., an interior hollow space of said cover member 80) thus at least partially accommodates the building chamber arrangement 26, the holding device 32 as well as the moving mechanism 48. In the shown example, the moving mechanism 48 defines a linear axis 86 which is directed so as to enable a movement of the building chamber arrangement 26 towards the stationary engagement unit 38. In this context, the term "stationary" relates to a relative movement between the building chamber arrangement 26 and engagement unit 38 for achieving an engagement therebetween. Yet, it does not exclude that the engagement unit 38 is rotatable within the receiving box 60 as discussed above.

The moving mechanism 48 and the building chamber arrangement 26 are coupled to one another by means of the holding device 32 which is arranged in a contacting region between these elements. The moving mechanism 48 and holding device 32 are permanently arranged within the cover member 80, whereas the building chamber arrangement 26 is selectively received therein. More precisely, the building chamber arrangement 26 can be picked up from, for example, a temporary storing position by connecting it to the holding device 32.

For doing so, the cover member 80 is further movable relative to the receiving box 60 along at least one further axis 88 extending substantially in parallel to the receiving box 60 or, in other words, extending substantially horizontally. Thereby, the cover member 80 can be moved as a whole relative to the receiving box 60 and also be arranged at positions remote therefrom, e.g. to pick up the building chamber arrangement 26. Said horizontal movement may be achieved by connecting the cover member 82 to an overhead crane (not shown). Said crane may further enable a movement of the cover member 80 towards the receiving box 60 and/or away therefrom, e.g. in a vertical direction extending substantially perpendicularly to the axis 88.

Therefore, the cover member 80 is configured to pick up the building chamber arrangement 26 and, by moving the non-illustrated crane accordingly, be arranged relative to the receiving box 60 in the predetermined connecting position shown in FIG. 6. In said predetermined position, the opened underside 84 of the cover member 80 faces the receiving box 60. Specifically, in said predetermined position the opened underside 84 faces the lock 64 of the receiving box.

Following that, a sealing unit 90 attached to an outside of the receiving box 60 and facing the opened underside 84 of the cover member 80 is actuated. In more detail, an extendable portion 92 in form of a bellow is moved from the receiving box 60 towards the cover member 80 so as to abut against an outside thereof. In the state of FIG. 6, this movement has already been completed. The sealing unit 90 thus defines a tunnel-like structure which encloses a connecting space 94 between the cover member 80 and the receiving box 60.

As a result, the space 82 enclosed by the cover member 80 is sealed from the ambient atmosphere. Moreover, the lock 64 is arranged in the connecting space 94 between the cover member 80 and the receiving box 60. Thus, when opening the lock 64, the cover member 80 and the receiving box 60 (and especially the respective spaces enclosed thereby) are fluidically coupled with one another while being sealed from the ambient atmosphere.

Yet, prior to opening the lock 64, an atmosphere within the space 82 (and within the space 94 enclosed the sealing unit 90) is controlled so as to match an atmosphere within the receiving box 60. Specifically, the same inert gas atmosphere is set within the space 82 as within the receiving box 60. For doing so, the cover member 80 comprises a gas inlet 96 and a gas outlet 98 which are connected to a non-depicted atmosphere control system. Note that for the sake of completeness, FIG. 6 also shows a similar gas inlet and outlet 96, 98 at the receiving box 60.

After having set the atmosphere within the cover member 80, the lock 64 is opened. Consequently, the engagement unit 38 within the receiving box 60 is rendered accessible without, however, exposing the interior of the receiving box 60 to the ambient atmosphere. Instead, the interior of the receiving box 60 is only exposed to the atmosphere within the cover member 80 which, however, has been controlled so as to match the atmosphere within the receiving box 60. Thus, less efforts are required for controlling and maintaining the atmosphere within the receiving box 60.

As a further advantage, no moving mechanisms need to be provided within the receiving box 60 for engaging the engagement unit 38 and the building chamber arrangement 26. Rather, these movements are accomplished by the above movement axes 86,88 of the cover member 80 and/or an additional overhead crane (not shown). Hence, design efforts regarding the engagement unit 38 can be limited and the engagement unit 38 can instead be optimized for withstanding the forces resulting from the above-discussed rotations and/or vibrations during powder removal.

Following the opening of the lock 64, the building chamber arrangement 26 is lowered into the receiving box 60 by means of the movement mechanism 48 and engages with the engagement unit 38.

The engagement between the building chamber arrangement 26 and the engagement unit 38 is produced according to the above discussion of e.g. FIGS. 4 and 5. In brief, the engagement unit 38 is configured to engage with the carrier 16 of the building chamber arrangement 26 by means of latching elements. Then, a relative movement between the building chamber 20 and the engagement unit 38 engaged with the carrier 16 is initiated by means of the moving mechanism 48 so as to allow a separation of the carrier 16 with the three-dimensional work piece received thereon from the building chamber 20. In other words, the moving mechanism 48 lifts the building chamber 20, while the engagement unit 38 with the carrier 16 fixed thereto stays in place until the three-dimensional work piece received on the carrier 16 is exposed (cf. FIG. 5). Upon separating the carrier 16 from the building chamber 20, most of the residual raw material powder contained in the building chamber 20 is gravity-driven released from the building chamber 20.

The moving mechanism 48 and the holding device 32 holding the building chamber 20 are then removed from the receiving box 60. Subsequently, the lock 64 is closed and powder removal takes place according to the above discussed first embodiment by means of rotations and vibrations. After having completed said powder removal, the moving mechanism 48 is again lowered into the receiving box 62 for connecting the unpacked work piece to the holding device 32. Then, said work piece is lifted into the cover member 80, upon which the lock 64 is closed.

Only after these steps have been completed, is the sealing unit 90 actuated so as to assume an inactive state. For doing so, the extendable bellow 92 is lowered towards the receiving box 60, so that the cover member 80 is not contacted any longer. Finally, the cover member 80 including the unpacked work piece can be lifted away from the receiving box 60 by means of the non-illustrated overhead crane. Hence, the unpacked work piece can be unloaded at a predetermined site.

Note that apart from the above discussed differences, the unpacking device 28 and in particular its receiving box 60 are generally configured according to the first embodiment. This also includes any of the above discussed further steps during operation of the unpacking device 28 as well as the numerous alternatives regarding e.g. the moving mechanism 48.

The invention claimed is:

1. An unpacking device for use in an apparatus for producing a three-dimensional work piece by irradiating layers of a raw material powder with electro-magnetic or particle radiation, the unpacking device comprising:
   a holding device which is configured to hold a building chamber arrangement, wherein the building chamber arrangement comprises a building chamber accommodating a carrier, and wherein the carrier is configured to receive a three-dimensional work piece produced from a raw material powder by an additive layering process,
   an engagement unit which is configured to engage with the carrier of the building chamber arrangement,
   a moving mechanism which is configured to cause a relative movement between the building chamber and the engagement unit with the carrier engaged therewith so as to allow a separation of the carrier with a three-dimensional work piece received thereon from the building chamber, and
   a raw material powder removal mechanism which is configured to cause at least one of a vibration and a rotation of the engagement unit with the carrier engaged therewith so as to remove residual raw material powder from the three-dimensional work piece received on the carrier.

2. The unpacking device according to claim 1, wherein the holding device is configured to interact with an outer surface of the building chamber.

3. The unpacking device according to claim 1, wherein the moving mechanism is configured to lift the building chamber and/or to lower the engagement unit with the carrier engaged therewith so as to separate the carrier from the building chamber.

4. The unpacking device according to claim 1, wherein the moving mechanism is configured to cause a relative movement between the building chamber arrangement and the engagement unit so as to bring the engagement unit into engagement with the carrier.

5. The unpacking device according to claim 4, wherein the moving mechanism is configured to lower the building chamber arrangement and/or to lift the engagement unit so as to bring the engagement unit into engagement with the carrier.

6. The unpacking device according to claim 1, wherein the raw material powder removal mechanism comprises a rotatable shaft which is attached to the engagement unit and which is connected to a driving motor, the driving motor being configured to cause a rotational movement of the rotatable shaft so as to rotate the engagement unit with the carrier engaged therewith.

7. The unpacking device according to claim 1, wherein the powder removal mechanism comprises a vibration motor which is connected to the engagement unit and which is configured to cause a vibration of the engagement unit with the carrier engaged therewith.

8. The unpacking device according to claim 1, further comprising a powder collection device which is configured to collect residual raw material powder removed from the three-dimensional work piece by means of the raw material powder removal mechanism.

9. The unpacking device according to claim 1, wherein the engagement unit is arranged in a sealed receiving box, wherein the receiving box is accessible via a lock which is configured to maintain a controlled atmosphere within the receiving box during engagement of the engagement unit with the carrier of the building chamber arrangement, during separation of the carrier with the three-dimensional work piece received thereon from the building chamber, and during removal of residual raw material powder from the three-dimensional work piece received on the carrier.

10. The unpacking device according to claim 1, wherein the engagement unit is arranged in a sealed receiving box, wherein the receiving box is accessible via a lock which is configured to maintain a controlled atmosphere within the receiving box during engagement of the engagement unit with the carrier of the building chamber arrangement, during separation of the carrier with the three-dimensional work piece received thereon from the building chamber, and during removal of residual raw material powder from the three-dimensional work piece received on the carrier, and wherein the receiving box is designed in the form of a glove box which is provided with at least one gripping glove.

11. The unpacking device according to claim 1, further comprising a suction system which is configured to withdraw residual raw material powder from the three-dimensional work piece received on the carrier.

12. A method of operating an unpacking device for use in an apparatus for producing a three-dimensional work piece by irradiating layers of a raw material powder with electro-magnetic or particle radiation, the method comprising:
    holding a building chamber arrangement by means of a holding device, wherein the building chamber arrangement comprises a building chamber accommodating a carrier, and wherein the carrier is configured to receive a three-dimensional work piece produced from a raw material powder by an additive layering process,
    engaging an engagement unit with the carrier of the building chamber arrangement,
    causing a relative movement between the building chamber and the engagement unit with the carrier engaged therewith by means of a moving mechanism so as to allow a separation of the carrier with a three-dimensional work piece received thereon from the building chamber, and
    causing at least one of a vibration and a rotation of the engagement unit with the carrier engaged therewith by means of a raw material powder removal mechanism so as to remove residual raw material powder from the three-dimensional work piece received on the carrier.

13. The method according to claim 12, wherein the holding device interacts with an outer surface of the building chamber.

14. The method according to claim 12, wherein the building chamber is lifted and/or the engagement unit with the carrier engaged therewith is lowered so as to separate the carrier from the building chamber.

15. The method according to claim 12, further comprising the step of causing a relative movement between the building chamber arrangement and the engagement unit by means of the moving mechanism so as to bring the engagement unit into engagement with the carrier.

16. The method according to claim 15, wherein the moving mechanism lowers the building chamber arrangement and/or lifts the engagement unit so as to bring the engagement unit into engagement with the carrier.

17. The method according to claim 12, wherein the raw material powder removal mechanism comprises at least one of:
   a rotatable shaft which is attached to the engagement unit and which is connected to a driving motor, the driving motor causing a rotational movement of the rotatable shaft so as to rotate the engagement unit with the carrier engaged therewith,
   a vibration motor which is connected to the engagement unit and causes a vibration of the engagement unit with the carrier engaged therewith.

18. The method according to claim 12, further comprising at least one of the following steps:
   collecting residual raw material powder removed from the three-dimensional work piece by means of the raw material powder removal mechanism,
   maintaining a controlled atmosphere within a sealed receiving box accommodating the engagement unit during engagement of the engagement unit with the carrier of the building chamber arrangement, during separation of the carrier with the three-dimensional work piece received thereon from the building chamber and during removal of residual raw material powder from the three-dimensional work piece received on the carrier by means of a lock providing access to the receiving box,
   withdrawing residual raw material powder from at least one of the three-dimensional work piece received on the carrier, the receiving box and the powder collection device by means of a suction system.

19. The method according to claim 18, wherein the receiving box is designed in the form of a glove box which is provided with at least one gripping glove.

20. An apparatus for producing a three-dimensional work piece by irradiating layers of a raw material powder with electromagnetic or particle radiation, the apparatus comprising:
   an unpacking device according to claim 1.

21. An unpacking device for use in an apparatus for producing a three-dimensional work piece by irradiating layers of a raw material powder with electro-magnetic or particle radiation, the unpacking device comprising:
   a holding device which is configured to hold a building chamber arrangement, wherein the building chamber arrangement comprises a building chamber accommodating a carrier, and wherein the carrier is configured to receive a three-dimensional work piece produced from a raw material powder by an additive layering process,
   an engagement unit which is configured to engage with the carrier of the building chamber arrangement, and
   a moving mechanism which is configured to cause a relative movement between the building chamber and the engagement unit with the carrier engaged therewith so as to allow a separation of the carrier with a three-dimensional work piece received thereon from the building chamber, wherein the moving mechanism is configured to lift the building chamber and/or to lower the engagement unit with the carrier engaged therewith so as to separate the carrier from the building chamber.

22. The unpacking device of claim 21, wherein the moving mechanism is configured to cause a relative movement between the building chamber arrangement and the engagement unit so as to bring the engagement unit into engagement with the carrier.

23. The unpacking device of claim 22, wherein the moving mechanism is configured to lower the building chamber arrangement and/or to lift the engagement unit so as to bring the engagement unit into engagement with the carrier.

24. The unpacking device of claim 21, further comprising a raw material powder removal mechanism which is configured to remove residual raw material powder from the three-dimensional work piece received on the carrier, wherein the raw material powder removal mechanism includes a rotatable shaft which is attached to the engagement unit and which is connected to a driving motor, the driving motor being configured to cause a rotational movement of the rotatable shaft so as to rotate the engagement unit with the carrier engaged therewith.

25. The unpacking device of claim 21, wherein the engagement unit is arranged in a sealed receiving box, wherein the receiving box is accessible via a lock which is configured to maintain a controlled atmosphere within the receiving box during engagement of the engagement unit with the carrier of the building chamber arrangement, during separation of the carrier with the three-dimensional work piece received thereon from the building chamber, and during removal of residual raw material powder from the three-dimensional work piece received on the carrier.

26. An unpacking device for use in an apparatus for producing a three-dimensional work piece by irradiating layers of a raw material powder with electro-magnetic or particle radiation, the unpacking device comprising:
   a holding device which is configured to hold a building chamber arrangement, wherein the building chamber arrangement comprises a building chamber accommodating a carrier, and wherein the carrier is configured to receive a three-dimensional work piece produced from a raw material powder by an additive layering process,
   an engagement unit which is configured to engage with the carrier of the building chamber arrangement, and
   a raw material powder removal mechanism which is configured to cause at least one of a vibration and a rotation of the engagement unit with the carrier engaged therewith so as to remove residual raw material powder from the three-dimensional work piece received on the carrier, wherein the raw material powder removal mechanism includes a rotatable shaft which is attached to the engagement unit and which is connected to a driving motor, the driving motor being configured to cause a rotational movement of the rotatable shaft so as to rotate the engagement unit with the carrier engaged therewith.

27. The unpacking device of claim 26, wherein the engagement unit is arranged in a sealed receiving box, wherein the receiving box is accessible via a lock which is configured to maintain a controlled atmosphere within the receiving box during engagement of the engagement unit with the carrier of the building chamber arrangement, during separation of the carrier with the three-dimensional work piece received thereon from the building chamber, and during removal of residual raw material powder from the three-dimensional work piece received on the carrier.

28. The unpacking device of claim 26, further comprising a moving mechanism configured to cause a relative movement between the building chamber arrangement and the engagement unit so as to bring the engagement unit into engagement with the carrier.

\* \* \* \* \*